(12) United States Patent
Tacklind et al.

(10) Patent No.: US 9,427,104 B1
(45) Date of Patent: Aug. 30, 2016

(54) METHOD FOR DETERMINING COFFEE BREWING PARAMETERS AND COFFEE BREWING PARAMETERS DEVELOPED THEREBY

(75) Inventors: Christopher Tacklind, Menlo Park, CA (US); R Brooke Hanson, Larkspur, CA (US)

(73) Assignee: SHEARWATER INVESTMENT CO., Larkspur, CA (US)

( * ) Notice: Subject to any disclaimer, the term of this patent is extended or adjusted under 35 U.S.C. 154(b) by 862 days.

(21) Appl. No.: 13/177,410

(22) Filed: Jul. 6, 2011

Related U.S. Application Data

(60) Provisional application No. 61/399,031, filed on Jul. 6, 2010.

(51) Int. Cl.
  *A23F 5/26* (2006.01)
  *A47J 31/00* (2006.01)

(52) U.S. Cl.
  CPC .............. *A47J 31/002* (2013.01); *A23F 5/26* (2013.01)

(58) Field of Classification Search
  USPC ........ 426/433, 432, 434, 435, 594, 595, 596
  See application file for complete search history.

(56) References Cited

U.S. PATENT DOCUMENTS

| | | |
|---|---|---|
| 4,100,306 A | 7/1978 | Gregg et al. |
| 4,823,685 A | 4/1989 | Boumans et al. |
| 4,967,647 A | 11/1990 | King |
| 5,285,718 A | 2/1994 | Webster et al. |
| 5,307,733 A | 5/1994 | Enomoto |
| 5,386,944 A | 2/1995 | Knepler et al. |
| 5,980,965 A * | 11/1999 | Jefferson et al. ............. 426/433 |
| 6,095,031 A | 8/2000 | Warne |
| 6,099,878 A | 8/2000 | Arksey |
| 6,279,461 B1 | 8/2001 | Fukushima et al. |
| 6,576,282 B1 | 6/2003 | Lassota |
| 6,772,676 B2 | 8/2004 | Lassota |
| 7,225,728 B2 * | 6/2007 | Lyall, III ........................ 99/299 |
| 7,228,066 B2 | 6/2007 | Pope |
| 7,258,062 B2 | 8/2007 | Green |
| 2003/0157227 A1 | 8/2003 | Leung et al. |
| 2005/0235834 A1 | 10/2005 | Blanc et al. |
| 2006/0188620 A1 | 8/2006 | Gutwein et al. |
| 2006/0191420 A1 | 8/2006 | Mazzola, Jr. et al. |
| 2007/0017382 A1 | 1/2007 | Takizawa et al. |
| 2007/0034083 A1 | 2/2007 | Van Hattem et al. |
| 2007/0034084 A1 | 2/2007 | Shertok et al. |

(Continued)

FOREIGN PATENT DOCUMENTS

WO PCT/AU2008/000187    2/2008

OTHER PUBLICATIONS

National Coffee Association. "How to Brew Coffee", Dec. 31, 2008, pp. 1-3.*

*Primary Examiner* — Humera Sheikh
*Assistant Examiner* — Stephanie Cox
(74) *Attorney, Agent, or Firm* — Bay Area Technology Law Group, PC

(57) ABSTRACT

A method of brewing a coffee beverage by combining a dose of granulated coffee and water and maintaining the granulated coffee in the water for a brew time. The volume of water employed in practicing the method is a function of the dose of granulated coffee and the brew time is a function of the percent extraction of coffee from the dose of granulated coffee and a function of the percent of total dissolved solids derived from the dose of granulated coffee.

9 Claims, 7 Drawing Sheets

(56) References Cited

U.S. PATENT DOCUMENTS

| | | |
|---|---|---|
| 2007/0089612 A1 | 4/2007 | Coccia et al. |
| 2007/0107604 A1 | 5/2007 | Wei |
| 2007/0131119 A1 | 6/2007 | Kodden et al. |
| 2007/0131121 A1 | 6/2007 | Pepper et al. |
| 2007/0154571 A1 | 7/2007 | Cao |
| 2007/0193452 A1 | 8/2007 | Campetella et al. |
| 2007/0214966 A1 | 9/2007 | Bishop et al. |
| 2008/0148956 A1 | 6/2008 | Maurer |

\* cited by examiner

METHOD FOR DETERMINING COFFEE BREWING PARAMETERS AND COFFEE BREWING PARAMETERS DEVELOPED THEREBY

RELATED APPLICATION

The present application is related to, and claims benefit of, U.S. Provisional Application No. 61/399,031, filed on Jul. 6, 2010.

TECHNICAL FIELD

The present invention is directed to a method to determine the precise brew parameters needed to produce a desired brewed coffee. Inputs include, but are not limited to, quantity of water, quantity of coffee, agitation, coffee roast, grind, desired extraction, and desired strength. The method applies to devices in common use and novel brewing systems. A novel user interaction is presented that greatly simplifies the brewing process for the user, yet results in precisely brewed coffee.

BACKGROUND OF THE INVENTION

In the crowded field of coffee makers, there are taught thousands of devices and methods for making coffee. Many of these make a variable quantity of coffee and/or variable strength coffee. This is accomplished by a myriad of devices from percolators, to simple drippers, through complex commercial systems. The resulting quality of the coffee is hotly debated in every coffee shop and now in every coffee blog. Every new device and method claims to be an improvement commonly without any objective justification.

In commercial vending systems, it is well understood that it is necessary to achieve the correct strength in the reconstituted mixture of coffee, soda, or juice. To this end various methods are used to ensure proper strength. Usually this involves metering the concentrate and water in a prescribed ratio. In U.S. Pat. No. 6,387,424 electric conductance of the mixture is measured to estimate the percentage of "Total Dissolved Solids" (% TDS) of the mixture. The % TDS is simply the ratio of the mass of the solid material to the total mass of the resulting mixture.

Only a few coffee patents even mention the concept of % TDS as a quantitative measure of the strength of the coffee. In U.S. Pat. No. 7,047,870 Gantt presents an apparatus and method for varying the strength of coffee in "pod" systems. In these systems, a pre-measured volume of ground coffee is packaged in a filter pod. The pod is placed in a machine and hot water is forced through it to produce a coffee beverage. In the method described, the apparatus removes varying percentages of the solid coffee to produce a "light," "regular," or "strong," cup of coffee. This is a disastrous recipe since it also changes the "Percent Extraction" (% EXT). This is the fraction of the original coffee grounds that is dissolved out into the resultant solution. 20% TDS+/−1% is generally considered the ideal extraction percentage. Above 22% EXT removes too much of the solids including compounds that make the resulting coffee taste bitter. Below 18% TDS presents an "under developed" taste.

It is typical of drip coffee makers to under extract the coffee. So a user that desires a stronger coffee has no choice but to use more grounds. Collectively, this results in a tremendous waste of coffee in the $18 billion domestic market.

The Specialty Coffee Association of America (SCCA), among others, promotes brewing charts to assist in making an ideal cup of coffee. These are used with an optical refraction meter or electrical conductivity meter to estimate % TDS. With the help of the chart the % EXT may also be inferred. The published advice however is limited to statements to the effect of "keep the water in contact with the grounds longer to get more extraction." This advice has no precision and leaves the aspiring brewer with a frustrating task.

Therefore it is an object of the present invention to teach a method to produce an ideal cup of coffee from any coffee brewing system. In doing so, reference is made to applicant's U.S. application Ser. No. 12/486,514 filed on Jun. 17, 2009, the disclosure of which is incorporated by reference herein.

This and further objects will be more readily apparent when considering the following disclosure and appended claims.

SUMMARY OF THE INVENTION

A method of brewing a coffee beverage by combining a dose of granulated coffee and water and maintaining the granulated coffee in the water for a brew time. The volume of water employed in practicing the method is a linear function of the dose of granulated coffee. The brew time is a piecewise linear function of the percent extraction of coffee from the dose of granulated coffee, the grind, and the roast.

DETAILED DESCRIPTION OF THE INVENTION

Figure 1:
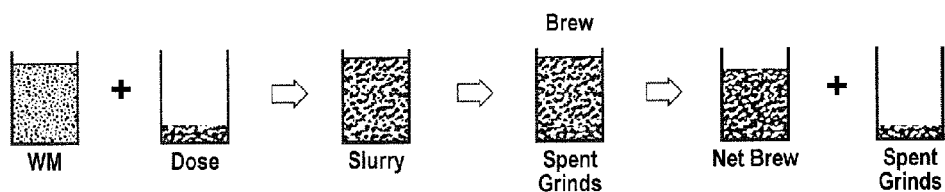
FIG. 1 is a schematic illustration of a coffee brewing process.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated.

There are, of course, additional features of the invention that will be described hereinafter and which will form additional subject matter of the claims appended hereto. Those skilled in the art will appreciate that the concept upon which this disclosure is based may readily be utilized as a basis for the designing of other structures, methods, and systems for carrying out the several purposes of the present invention. It is important therefore that claims be regarded as including such equivalent constructions insofar as they do not depart from the spirit and scope of the present invention.

Certain terminology and the derivations thereof may be used in the following description for convenience and reference only and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

To appreciate the present method one needs to do a little math. First, one defines DS as the mass of the dissolved solids in a batch of coffee. Then, for a mass of coffee grinds specified by "Dose"

$$DS = \% \ EXT \times Dose \quad (1)$$

For example, if 20% out of 25 grams of coffee grounds is extracted $$DS = 0.20 \times 25 \ \text{grams} \quad (2)$$

$$DS = 5 \ \text{grams} \quad (3)$$

Let the mass of the water used for the brew be denoted by WM. Then the % TDS is given by the ratio of the dissolved solids divided by the total mass written as $$\% \ TDS = \frac{DS}{DS + WM} \quad (4)$$

Substituting the expression for DS from equation (1) in equation (4)

$$\% \ TDS = \frac{\% \ EXT * Dose}{(\%EXT * Dose) + WM} \quad (5)$$

If 400 grams of water is used with the 25 grams of coffee and 20% extraction the following equation shows a typical % TDS calculation:

$$\% \ TDS = \frac{.20 \times 25 \ \text{grams}}{.20 \times 25 \ \text{grams} + 400 \ \text{grams}} \quad (6)$$

$$= .012346 \quad (7)$$

$$= 1.2346\% \quad (8)$$

Since % EXT cannot be written in the form % TDS=A+B*% EXT, % TDS is not linearly related to % EXT. However, by dividing the numerator and denominator by WM, the % TDS can be expressed as $$\% \ TDS = \frac{\frac{\% \ EXT * Dose}{WM}}{\left(\frac{\%EXT * Dose}{WM}\right) + 1} \quad (9)$$

If we let X be the ratio of dissolved coffee to water $$X = \frac{\% \ EXT * Dose}{WM}$$

then $$\%TDS = \frac{X}{X+1}$$

Since X is small one is compelled to use a Taylor series expansion providing the equivalent expression $$\% \ TDS = X - X^2 + X^3 - X^4 + X^5 - \ldots$$

Again, since X is small, $X^2$ is very small, $X^3$ is even smaller, and so on, so the reasonable linear approximation for % TDS is $$\% \ TDS = \frac{\% \ EXT * Dose}{WM} \quad (12)$$

As an example, if WM=400 grams and Dose=25 grams with 20% EXT, $$\% \ TDS = \frac{.20 * 25 \ \text{grams}}{400 \ \text{grams}} \quad (13)$$

$$= 0.0125 \quad (14)$$

$$= 1.25\% \quad (15)$$

This is just 1.2% larger than the exact result. As such, the Taylor series expansion is a reasonable estimate.

Recognizing that water expands as it is heated, volume measurements can confound precise coffee brewing. For this reason it is prudent to use mass measurements when possible. Dividing both sides of equation (12) by % EXT the following ratio results $$\frac{Dose}{WM} = \frac{\% \ TDS}{\% \ EXT} \quad (21)$$

Thus, if % TDS and % EXT are chosen, a precise ratio of initial water to coffee results.

One may also need to estimate the mass of the final coffee product delivered. As a convenient approximation, it turns out that the water trapped in the spent grinds is about twice the Dose. Therefore, the net brewed coffee is approximately $$NetBrew = (WM + \text{Dose}) - 2*\text{Dose} - \text{Dose} \quad (22)$$

$$= \text{"total start"} - \text{"water trapped"} - \text{"grinds"} \quad (23)$$

$$= WM - 2*\text{Dose} \quad (24)$$

The foregoing requires that one has a means for measuring the % TDS or % EXT. This might be done by carefully measuring the mass of coffee used compared to the mass of coffee after the extraction. In spite of the simplicity of this idea, it is confounded by the fact that some of the brewed coffee is trapped in the spent grinds. This brewed coffee contributes to the mass reading after the extraction.

The most straightforward method is to carefully measure the mass of the grinds before the brewing process. After the brewing process, the spent grinds may be dried, driving off all the water. In each case, one must be careful to drive off all of the water, including moisture picked up from the air. A test sample of 25 gms absorbed about 1 gm of water from the air in a 50% relative humidity test.

The mass difference is exactly the portion of the solids that went into solution. So $$\% \; EXT = \frac{NetDose - SpentSolids}{\text{Dose}}$$

To measure % TDS directly one needs to measure the solids in the NetBrew. That is, take any cup of coffee and weigh it. This is the NetBrew. Then dry it out and weigh the residue. This is the NetSolids. As such:

$$\% \; TDS = \frac{NetSolids}{NetBrew} \quad (64)$$

The only drawback with this method is that it involves removing considerably more water than in the previous method. The water can be driven off by boiling but care needs to be taken to not burn the residue for fear that it may drive off some solids or chemically alter them.

A remarkably straightforward way to dehydrate the brewed coffee is to put it in a vacuum chamber. Heating the vessel decreases the dehydration time. Using this method one would be able to make a test cup of coffee brewed with 25 grams of grinds, 400 grams of water, yielding 350 grams of coffee. Upon drying the coffee a dry residue of 4.375 grams should be recovered. The total dissolved solids in this example is:

$$\% \; TDS = 4.375 \text{ grams}/350 \text{ grams} \quad (65)$$

$$= 1.25\% \quad (66)$$

The above methods are laborious and prone to errors due to spillage and human error. Unfortunately, no instrument exists that will read percent total dissolved solids directly. Fortunately, the % TDS changes many properties of the fluid. These include, but are not limited to, the optical index of refraction of the fluid, optical transparency, physical density, and electrical conductivity.

Numerous devices are on the market that measure index of refraction. A refractometer may be a simple optical device or electronic device. Simple optical devices are plentiful in industrial use.

One simple electronic device tested has 4 digit decimal precision. This is problematic since the index of refraction of distilled water (at 20° C.) is 1.3330. The index of refraction at 1.25% % TDS is 1.3352. This is a difference of just 22 counts over the nominal scale. The target range of 1.15% to 1.35% is spanned by just 5 counts. This is insufficient for all but the most cursory investigations. The accuracy would need to be less than one count to be of any use at all. Five digit precision index of refraction meters are many thousands of dollars making them prohibitive for many users.

Electrical conductivity is easier to measure with high precision and accuracy. For example, the Ultrameter 4P from Myron L Company measures conductivity and uses the value to compute % TDS. This device is auto ranging with a 4 digit readout and resolution down to 0.01 parts per million. 1.25% TDS is 12500 parts per million so it would appear this meter has about 60 times the nominal scale resolution of the simple refractometer. The target range of 1.15% to 1.35% is spanned by 2000 counts. This is more than adequate for coffee testing. The stated accuracy is 1% of reading or about 125 counts in the nominal case of interest. The zero is readily set using distilled water and precision calibration solutions are available.

The % TDS and conductivity were established for this meter using various solutions including sodium chloride or potassium chloride or a combination of salts to mimic fresh water solids. It is reasonable to assume that the NaCl scale is suitable for testing assuming linearity and scaling.

Calibration solutions are available from many manufacturers. For example, Hanna Instruments supplies a TDS Calibration solution "HI 7032". At 25° C. it should read 1382 ppm. Although the sample fails to disclose the composition, this reading is only obtained on the Ultrameter's NaCl scale. Note that 1382 ppm is only 0.1382% solution. This is roughly one tenth the magnitude of interest for coffee. But making a NaCl test solution is a trivial exercise with an accurate scale. An "A&D FX2000" electronic balance was used in our testing. It reads to 0.01 gram. 5.00 grams of table salt dissolved into 395.00 grams of water yields a 1.25%+/-0.0025% TDS solution.

To compare readings with coffee we need a precise coffee solution. After a few cups of coffee have been dried, one has a collection of brewed coffee solids. These may be reconstituted by dissolving in water. It is worth noting that the solids need to come from approximately 20% extractions. That is, it is not valid to take whole coffee and grind it to a fine powder to form a test solution unless that is how you are making coffee. A wide variety of coffees and roasts could be used to get a broad average response. It is worth verifying that there is negligible difference between different roasts. A test solution with 1.25% TDS was carefully prepared as in the above case.

A test solution was also made from Folgers® brand instant "freeze dried coffee". If this is similar to a solution made from real coffee it would be a convenient surrogate.

The conductivity of each of these solutions was then measured using the Ultrameter 4P.

1.25% NaCl 1111=>20.62 millisiemens
1.25% Coffee=>2.500 millisiemens
1.25% Instant Coffee=>1.360 millisiemens So it is evident that Coffee has about on tenth the conductivity of NaCl and that instant coffee does not have similar conductivity to reconstituted coffee of the same % TDS.

With these test solutions in hand, it is easy to dilute them in a series of steps. At each step, the conductivity is measured. The relationship between conductivity and % TDS is then inferred. For example, the procedure was begun with 246.21 grams of the NaCl solution for which the conductivity was measured. This is diluted to a total mass of 309.06 grams. This is now a 0.997% solution having a conductivity of 16.98 millisiemens. The table below shows a spreadsheet of repeating this until the lowest dilution is 0.236%.

| Batch mass (gms) | solids (gms) | diluted to | % TDS | Cond (mS) | Measured % TDS (PPM) | Measured % TDS (%) | Meter to Measured Ratio |
|---|---|---|---|---|---|---|---|
|  | 3.08 | 246.21 | 1.25% | 20.62 | 12,010 | 1.20% | 1.041 |
| 246.21 | 3.08 | 309.06 | 1.00% | 16.98 | 9,677 | 0.97% | 1.029 |
| 296.09 | 2.95 | 360.20 | 0.82% | 14.14 | 7,950 | 0.80% | 1.03 |
| 348.73 | 2.85 | 465.60 | 0.61% | 10.79 | 5,954 | 0.60% | 1.03 |
| 454.14 | 2.78 | 582.57 | 0.48% | 8.54 | 4,640 | 0.46% | 1.03 |
| 571.22 | 2.73 | 788.01 | 0.35% | 6.30 | 3,354 | 0.34% | 1.033 |
| 436.93 | 1.51 | 640.90 | 0.24% | 4.39 | 2,297 | 0.23% | 1.028 |
|  |  |  |  |  |  |  | 1.031 average |

From the above, it is seen that the computed % TDS compare well with the results reported by the Ultrameter. The last column shows the ratio of the two different measures. This is rather consistent with an average reading just 3% below the actual % TDS. This would readily be calibrated out on the Ultrameter.

Figure 2:
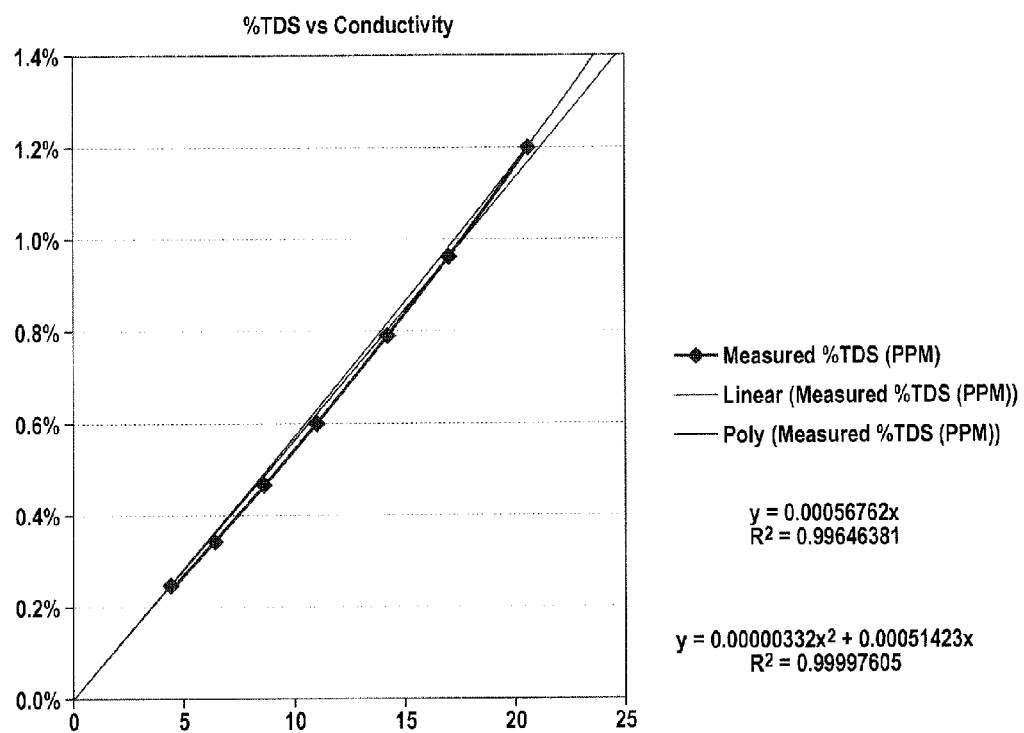
FIG. 2 is a graphical representation of the relationship between conductivity and % TDS of a salt solution.

Of more interest is the relationship between conductivity and % TDS. This is readily visualized by plotting % TDS as a function of conductivity as shown in FIG. 2.

It would appear that a linear fit is adequate for the present purposes. This would be even more so if one was to fit a line only in the region in the vicinity of 1.25%+/−0.5%. But it is also clear that a quadratic fits the data exceptionally well.

This procedure was repeated with the 1.25% solution made from coffee solids. This procedure was started with just 44.23 grams of 1.25% solution. This was carefully diluted in steps until a 0.252% solution was achieved. The following spreadsheet shows the values obtained.

| Batch mass (gms) | solids (gms) | diluted to | Cond (mS) | % TDS | Measured % TDS (PPM) | NaCl % TDS (%) | Ratio to NaCl solution |
|---|---|---|---|---|---|---|---|
|  | 0.55 | 44.23 | 2.5000 | 1.25% | 1273.0 | 0.13% | 9.819 |
| 44.17 | 0.55 | 51.81 | 2.1620 | 1.07% | 1090.0 | 0.11% | 9.777 |
| 51.74 | 0.55 | 58.48 | 1.9320 | 0.94% | 970.4 | 0.10% | 9.716 |
| 58.46 | 0.55 | 75.25 | 1.5300 | 0.73% | 762.8 | 0.08% | 9.603 |
| 75.10 | 0.55 | 108.65 | 1.0850 | 0.51% | 535.3 | 0.05% | 9.458 |
| 108.57 | 0.55 | 163.16 | 0.7451 | 0.34% | 362.9 | 0.04% | 9.284 |
| 160.67 | 0.54 | 214.73 | 0.5689 | 0.25% | 257.9 | 0.03% | 9.774 |
|  |  |  |  |  |  |  | 9.633 Average |

Figure 3:
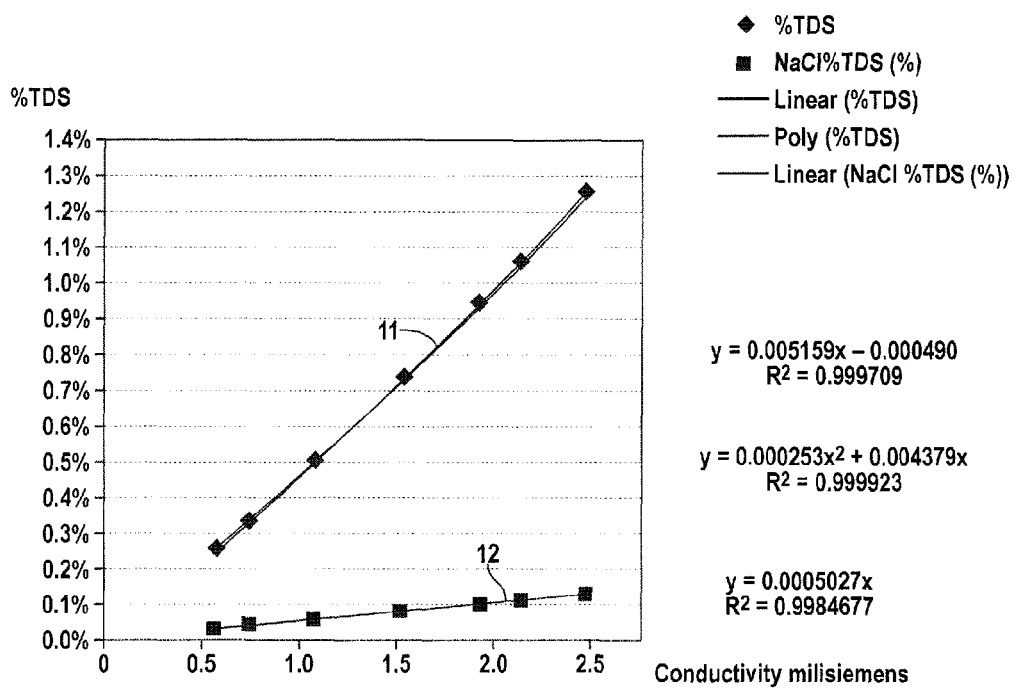
FIG. 3 is a graphical representation of % TDS vs. conductivity of a solution made of coffee solids.

From the last column, it is observed that the meter readings are on average 1/9.6 of the true % TDS. As with the NaCl solution, the % TDS is plotted as a function of conductivity as shown in FIG. 3, curve 11. Had the NaCl scale only been used the indicated % TDS would be as shown as curve 12.

"All sensors are thermometers" is certainly true in the case of refractometers and conductivity meters. So it is routine to include precision thermometers in meters to measure the sample temperature. A linear or higher order function is used to provide automatic compensation to a standard reference temperature. In the 4P meter, the calibration values are user settable. This is somewhat straightforward since the outcome must be a constant reading for any sample regardless of temperature. If the results are not constant, the temperature compensation is not correct. It is simple to use a test solution at an elevated temperature and repeat the tests as the sample cools. For example, the spreadsheet below shows the conductivity slowly increasing as a sample of coffee cools.

| time (min) | cond (uS) | Deg C. |
|---|---|---|
| 0.0 | 2487 | 54.9 |
| 0.5 | 2493 | 50.4 |
| 2.0 | 2500 | 47.1 |
| 3.0 | 2498 | 44.7 |
| 7.0 | 2511 | 39.0 |
| 10.0 | 2517 | 36.4 |
| 12.0 | 2517 | 34.8 |

Figure 4:
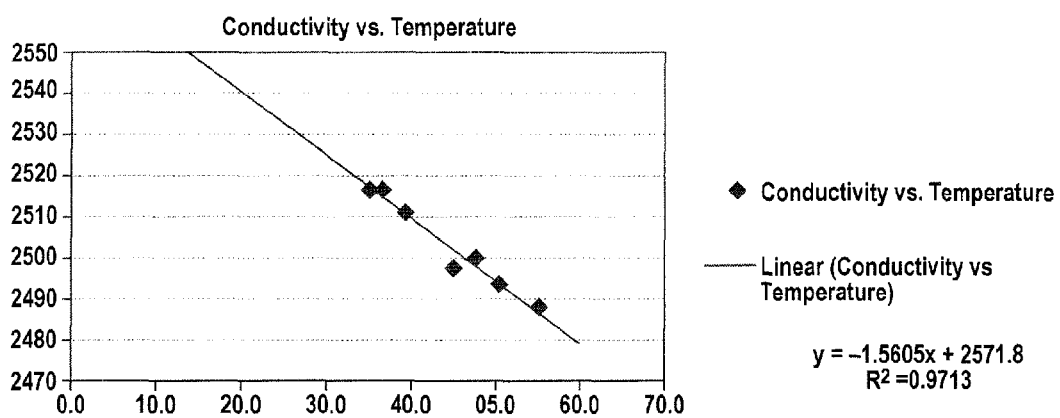
FIG. 4 is a graphical representation of solution conductivity as a function of temperature for a test solution.

This is shown graphically in FIG. 4.

To make practical use of this, one chooses a reference temperature and computes the offset in conductivity needed to correct the conductivity measurement. For example, for a 25 degree C. reference temperature, the linear relationship that is derived is Correction=1.56*temperature−39.0

Corrected Conductivity=Conductivity+Correction

As a check, note that at 25 degrees the correction is zero. Many are more comfortable with a chart showing the correction. For 25° C.:

| Deg C. | Correction |
|---|---|
| 18 | −10.9 |
| 19 | −9.4 |
| 20 | −7.8 |
| 21 | −6.2 |
| 22 | −4.7 |
| 23 | −3.1 |
| 24 | −1.6 |
| 25 | 0 |
| 26 | 1.6 |
| 27 | 3.1 |
| 28 | 4.7 |
| 29 | 6.2 |
| 30 | 7.8 |
| 31 | 9.4 |
| 32 | 10.9 |
| 33 | 12.5 |
| 34 | 14.0 |
| 35 | 15.6 |
| 36 | 17.2 |
| 37 | 18.7 |
| 38 | 20.3 |
| 39 | 21.8 |
| 40 | 23.4 |

-continued

| Deg C. | Correction |
|---|---|
| 41 | 25.0 |
| 42 | 26.5 |
| 43 | 28.1 |
| 44 | 29.6 |
| 45 | 31.2 |
| 46 | 32.8 |
| 47 | 34.3 |
| 48 | 35.9 |
| 49 | 37.5 |
| 50 | 39.0 |

Figure 5:
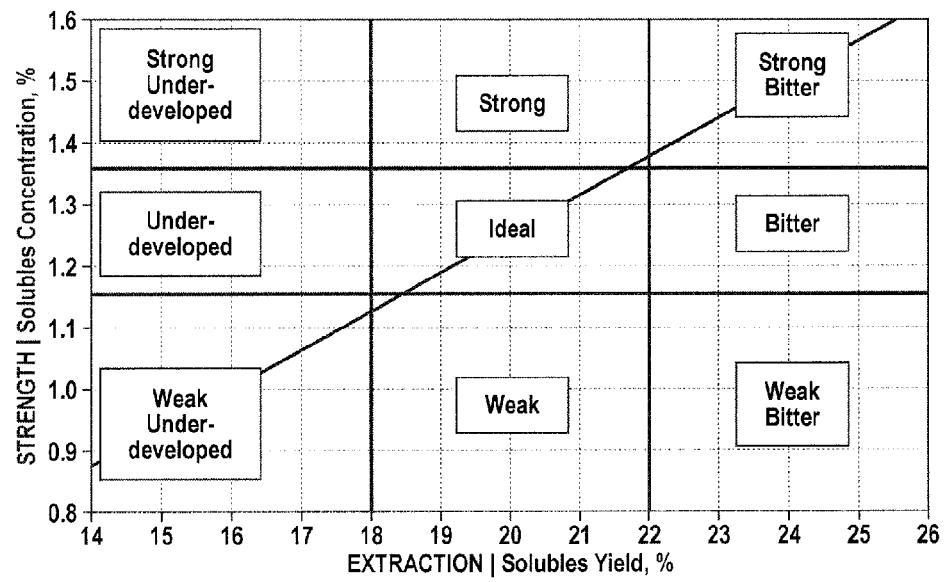
FIG. 5 is an extraction chart based on SCAA recommendations.

FIG. 5 is an extraction chart based on the SCAA recommendations. Other coffee groups publish similar charts with slightly different demarcations for the regions. All of them have differing diagonal extraction lines. Line 15 is from the example illustrated above. According to equation (9) line 15 has a slope of Dose/WM.

For some coffee makers or procedures the outcome will be weak and underdeveloped. For other procedures the outcome will be strong and bitter. It needs to be made clear that for a given ratio of water to grinds, the outcome will be along brew line 15 which is simply the ratio of the % EXT to % TDS. To move to other states such as weak and bitter would require changing the ratio of coffee to water. Only for a well crafted coffee machine or procedure will the outcome land in the ideal zone. This requires getting the right amount of water, at the right temperature, amount of coffee grinds, suitable grind, right amount of interaction between the grinds and water, and not too much interaction.

It is remarkable that a drip coffee machine is passable as a coffee maker. In the traditional drip machine, water dribbles in, and then it leaches through the coffee bed as more water dribbles in. This continues for a while before the grinds are uniformly wetted. For a manual one-cup drip cone the state of the art is to use trial and error to find a set of steps that produce a desirable product. The resulting recipe is recorded and then repeated from shop to shop. The task is even more daunting for the designer of a home drip machine which needs to produce a variety of volumes.

A more controllable method is needed with sufficient variables so that the ideal brew point can be achieved each time. Moreover, the brew variables including but not limited to darkness of roast, grind size, and volume of the brew, all need to be accounted for to produce a desired product every time.

Figure 6:
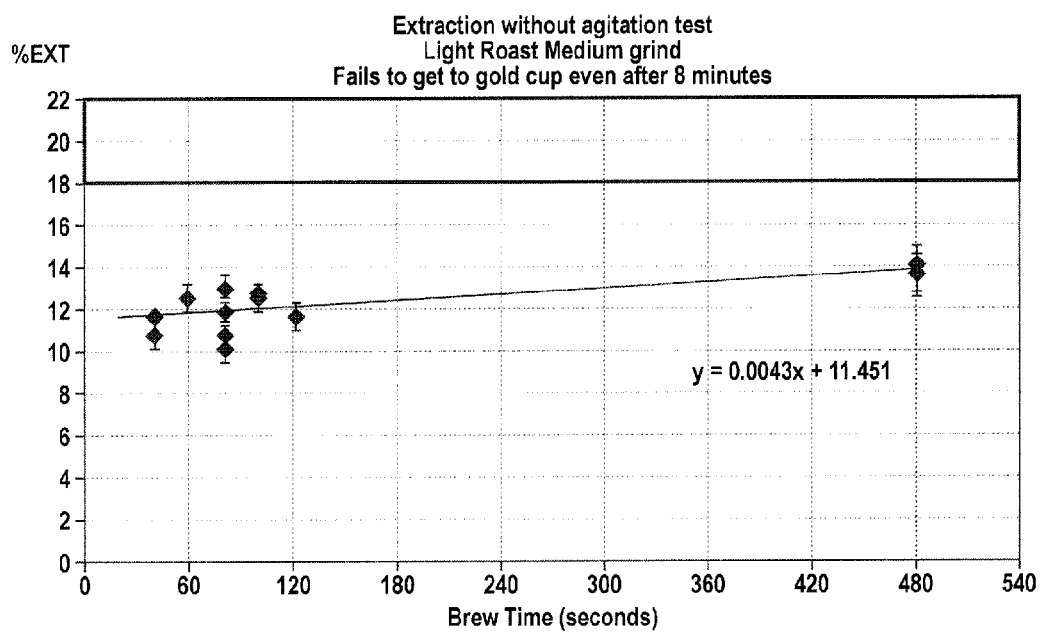
FIG. 6 is a graphical representation of % EXT as a function of brew time for a light roast, medium grind coffee.

For steeped coffee, a simple apparatus for brewing can be selected from the prior art. In the practice known as a French Press the coffee and grinds are introduced into a brewing chamber and held there. From the foregoing discussion, it is known that one needs to have a ratio of water to grinds such that the desired % EXT to % TDS point may be intersected. It stands to reason that the longer the slurry stands, the more extraction will occur. It is surprising to find that the rate of extraction is extremely slow. For medium grinds, the desired 20% EXT is not achieved after 8 minutes in the lab examples shown in FIG. 6.

The effect of agitation was next explored by spoon agitating the contents of a French Press. A French Press is presented as a simple example of an apparatus of the prior art to which this method may be applied. A series of brews were made wherein the grind, water mass, grind mass, were all kept constant from one cup to the next. During the brew period, the slurry was gently stirred at a rate of about 1 cycle per second. At the end of the brew period, the slurry was poured through a paper filter. The resulting brew was tested for % TDS and the results depicted schematically in FIG. 7. A linear fit suggests that $$\% \ TDS = 0.0000135 * BrewTime + 0.0115218 \tag{70}$$

Figure 7:
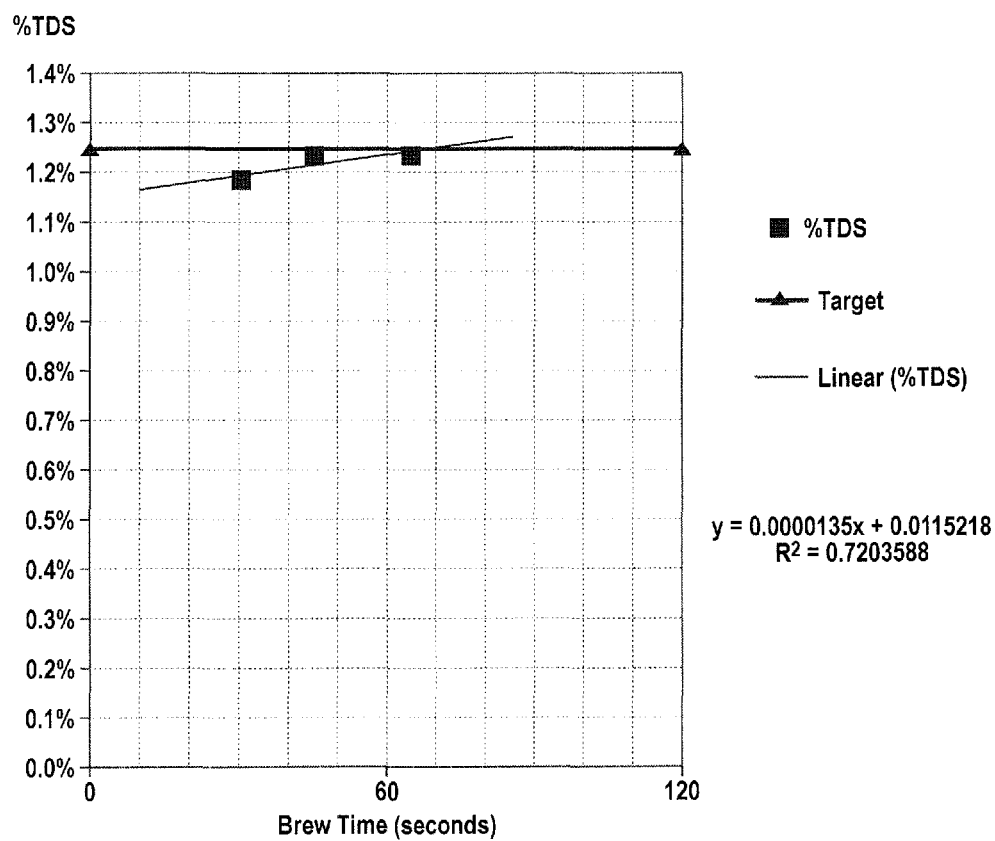
FIG. 7 is a graphical representation of the effect of spoon agitation on coffee slurries held in a French Press as a function of % TDS vs. brew time.

In the example shown in FIG. 7, the ideal brew occurs at about 68 seconds. It is important to notice that for longer agitation, the brew is over extracted. This would be a bitter undesirable outcome. So there is a down side to stirring too long.

Up to now, nothing more has been accomplished than to find a particular brew recipe using experimental non-subjective data to interpolate to an ideal brew time with agitation. The observation that % TDS is linear with brew time may be exploited by solving (70) for BrewTime (in seconds):

$$BrewTime = 74,074 * \% \ TDS - 853.5 \tag{71}$$

Using equation (21) this can be converted to % EXT by noting that:

$$\% \ TDS = \% \ EXT * (Dose/WM) \tag{72}$$

Combining (72) into (70) yields:

$$BrewTime = 74,074 * \% \ EXT * (Dose/WM) - 853.5 \tag{73}$$

Note that this is true for any % EXT desired in the range of interest for this process. It is not a single recipe, but a method for determining the recipe. Thus, the first example of the present novel method of brewing coffee is to select a desired % EXT, % TDS, and NetBrew. Use equation (24) to select the WM. Use equation (21) to select the coffee Dose, and finally use equation (71) to determine the BrewTime.

The general goal is to be able to specify a quantity for NetBrew and the coffee style desired. Then, for a given type of coffee and grind, an algorithm will determine the amount of water needed, amount of coffee, the steeping time, agitation time, and any other brew parameters.

From the brew chart defined by SCAA (FIG. 5) and others, it is seen that the "coffee strength" and "development" are determined by the % TDS and % EXT. The % TDS is certainly a consumer preference. Some prefer a light cup and others prefer a strong cup of coffee. % EXT is perhaps more debatable, as 20% EXT would be suitable for all coffee unless a more discerning palette would like to vary from this set point. Certainly, the equations need to include this variable.

Without loss of generality % TDS, % EXT, NetBrew, Roast, and Grind can be specified. The Brew Mass and Dose are then determined by rearranging (12) to $$Dose = WM * \frac{\% \ EXT}{\% \ TDS} \tag{80}$$

And plugging into (53)

$$NetBrew = WM - 2 * WM * \frac{\% \ EXT}{\% \ TDS} \tag{81}$$

$$NetBrew = WM * \left(1 - 2 * \frac{\% \ EXT}{\% \ TDS}\right) \tag{82}$$

$$WM = \frac{NetBrew}{1 - 2 * \frac{\%\ EXT}{\%\ TDS}} \quad (83)$$

By using (83) to determine WM, (80) can be used to determine Dose.

What is needed next is a prescription on how to move along the extraction line.

In the preceding example, the BrewTime depends linearly on the % EXT. If another variable is introduced such as the grind size a second term may be added in the form of Grind:

$$BrewTime = A + B*\%\ TDS + C*Grind \quad (90)$$

This is the equation of an oblique plane where the "X" axis is the % EXT, the "Y" axis is the Grind and the "Z" direction is the BrewTime. That is, for each value of % TDS and each value of Grind, the method prescribes a well-defined BrewTime. Likewise, BrewTime can be represented as a "hyperplane" where BrewTime is defined by a linear equation of the form $$BrewTime = A + B*\%\ TDS + C*Grind + D*Roast + E*WM + F*Temperature \quad (91)$$

Note that for a particular apparatus, some the coefficients may be zero or nearly so and may be ignored. Note also that % EXT is not included since it is a function of % TDS. In this example, the BrewTime is a function of, but not limited to, 5 variables. Others may include agitation intensity, altitude, age of the coffee, roast, grind, and even region of origin of the coffee. Some of these factors might be gathered together into a single ranking number to simplify things for the consumer.

The form presented is that of a linear equation. This is not to say that a higher order polynomial could not be used. It is likely that this would offer little improvement. Piecewise linear approximations could also be used. Cross terms could also be used such as Grind*Temperature but these just result in nonlinearities that offer little benefit over a linear approximation in the region of interest.

Other methods of agitation can be employed as the use of a stirring spoon falls short of the convenience that a modern consumer expects in a brewing device. In a preferred embodiment the agitation may be in the form of a mechanized mechanical agitator. Mechanical means are common in the prior art. In means characterized by a forced extraction of the brew from the brew chamber the prior art includes introducing bubbles from underneath a filter under the bed of grinds. In a preferred embodiment the agitation is provided by a stream of bubbles introduced near the bottom of the slurry. In yet another preferred embodiment, the agitation is provided by periodic bursts of compressed air introduced through a tube near the bottom of the slurry. In each of these embodiments the extraction percentage would be expected to increase linearly with time.

In the example below, the apparatus disclosed in the '514 application was employed. It was seen that the % EXT varies with time in an apparatus that uses bursts of bubbles introduced into the slurry held in a paper cone.

Experiment details:
Air supply pressure: 60 psi
Pulse width: 30 msec from a 40 psi source
Valve: Parker SRS Series plastic solenoid valve #911-000006-011
Controller: Basic Stamp 2

Figure 8:
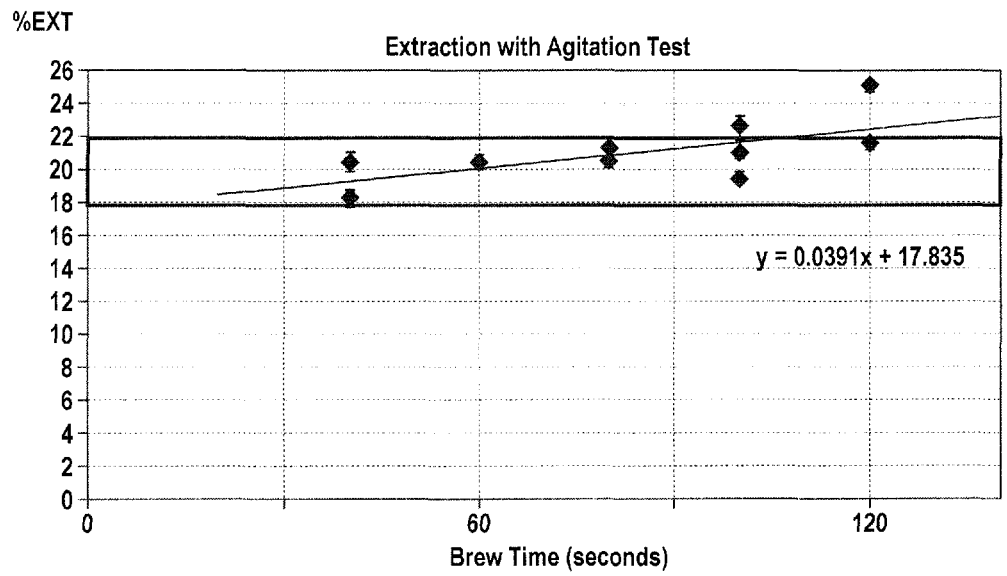
FIG. 8 is a graphical representation of % EXT vs. brew time for an example using an agitator suggested in applicant's U.S. application Ser. No. 12/486,514.

The results are shown graphically in FIG. 8 including a linear fit of % EXT to time.

% EXT=0.0391*time+17.835 solving for BrewTime, for this process we get $$BrewTime = 25.57*\%\ EXT - 456.1 \quad (100)$$

The constant term is the collection of all the other terms that are held constant for this experiment. This specifies that for a 20% extraction we need a brew time of 55 seconds for this process.

It should be noticed that % EXT as a function of time should have an exponential character. More specifically, a given process will have a certain % EXT at zero time. At very large times, the % EXT will asymptotically approach a maximum value as all of the soluble solids have been removed. It was instructive to find these minimum and maximum values along with times in the vicinity of 20%. An expontial may be fitted to collected data points and inverted to yield a more general expression for BrewTime a function of desired % EXT. It suffices to use a linear approximation in the area of interest. A piecewise linear approximation may be used to extend the range beyond the nominal % EXT if needed.

Figure 9:
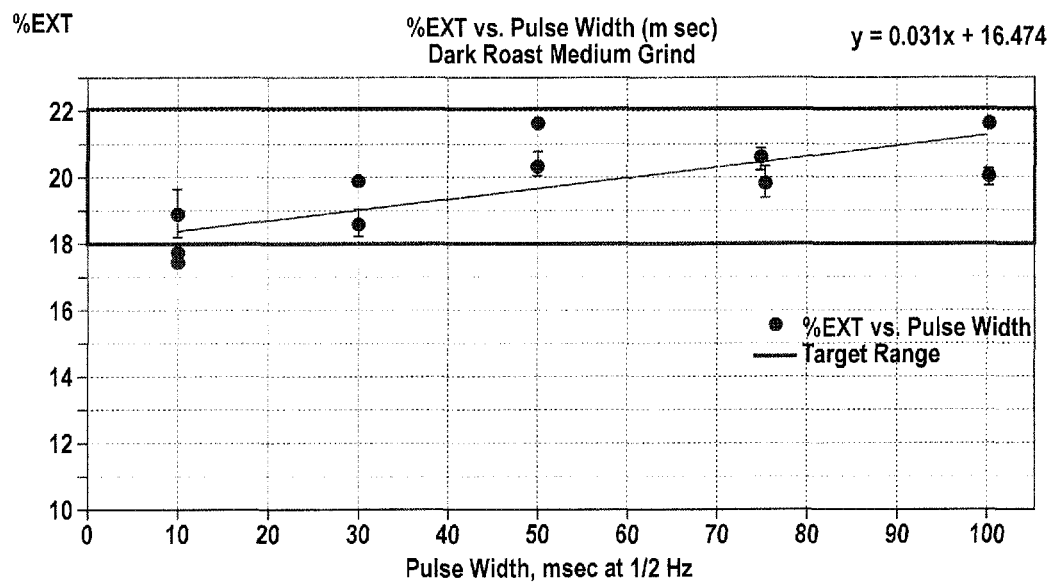
FIG. 9 is a graphical representation of % EXT vs. pulse width agitation over a targeted range.

Manual agitation may be a time honored method used to get higher extraction, but from the above it can be seen that it is possible to over agitate and extract too much of the solids. So in preferred embodiments, it is desirable to control the agitation parameters. These include but are not limited to the time of agitation and the intensity of the agitation. For example, in FIG. 9 results are depicted when the agitation pulse is varied from 10 milliseconds to 100 milliseconds. In each case the resulting extraction is within the target range but for the other parameters used, the best choice is about 60 milliseconds.

To complete the analysis of this variable, this experiment is repeated at a few other brew times. This step is shown for the next two variables of grind and roast.

In order to do the arithmetic, one needs to have numeric representations for each term. WM and Dose are well represented in grams. % TDS is a percentage. % EXT depends on WM, Dose and % EXT as given in equation (12).

Without loss of generality, the common "grind number" can be used to specify the grind. The "medium grind" is generally taken to be 5. The scale generally goes from 1 to 9 with 9 being the super fine needed for espresso machines, 2 being the very coarse used for a French Press.

Figure 10:
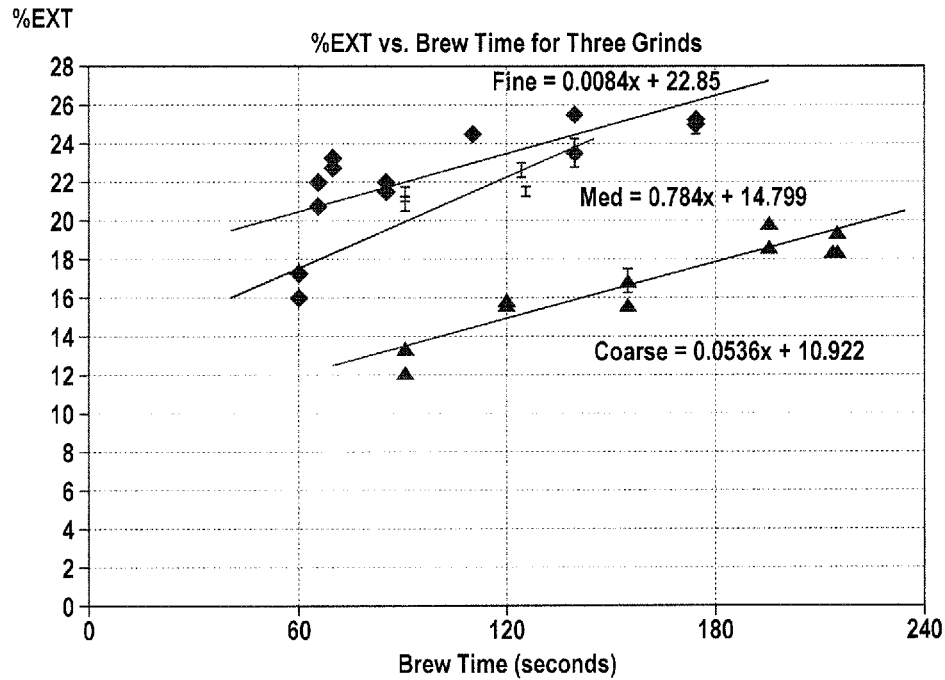
FIG. 10 is a graphical representation of % EXT vs. brew time for three different grinds of coffee.

Each different grind number also has a characteristic extraction verses time curve. FIG. 10 depicts the extraction verses time for several different grind settings. For the super fine "espresso grind" the optimal extraction happens almost immediately. This means it is difficult to prevent over extraction.

Assuming Fine=7, Med=5, and Coarse=2 and in referring to FIG. 10, when each crosses the 20% mark, the following is noted:

| Grind # | seconds to 20% EXT |
|---|---|
| 7 | 50 |
| 5 | 85 |
| 2 | 215 |

Figure 11:
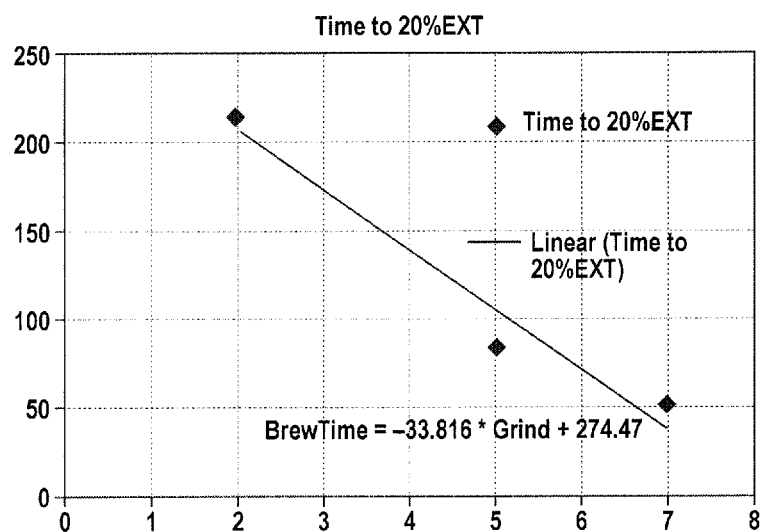
FIG. 11 is a graphical representation of brew time vs. coffee grind number to reach a targeted 20% EXT.

FIG. 11 shows the plotting of this and fitting a line to these few points.

From FIG. 11, for this embodiment a method is derived which gives the partial brew formula:

$$BrewTime = -33.8*Grind + 274.5 \quad (101)$$

Here the constant term 274.5 is the sum of all the other terms.

A roast specification may also be useful. An industry standard Agtron Analyzer assigns number for each roast. The lower the Agtron number the darker the roast. The Agtron Gourmet Roast Classification Scale has two chemical anchor points of reference. A product score of zero (00.0) indicates a thermal reduction of one hundred percent (100%) of the soluble organic chemistry to carbon, a roast so dark that it would have no flavor or aromatic qualities in the cup. A product score of one hundred and five (105.0) indicates the fracturing of three to five (3-5%) percent of the principle coffee sugar sucrose, too light a roast for consumption but one that could be identified as "coffee-like" in a double blind tasting. Most coffee is roasted between scores of 25 and 75, with commercial scores primarily between 55 and 75, and specialty scores in the range of 25 to 55. As a reference, the character of one of the more pronounced classifications, French Roast, begins to develop at a score of about 35, while Cinnamon classification, often used when sample roasting to exaggerate cup defects, is between a score of 85 and 90. So a reasonable average or typical value would be 50.

Figure 12:
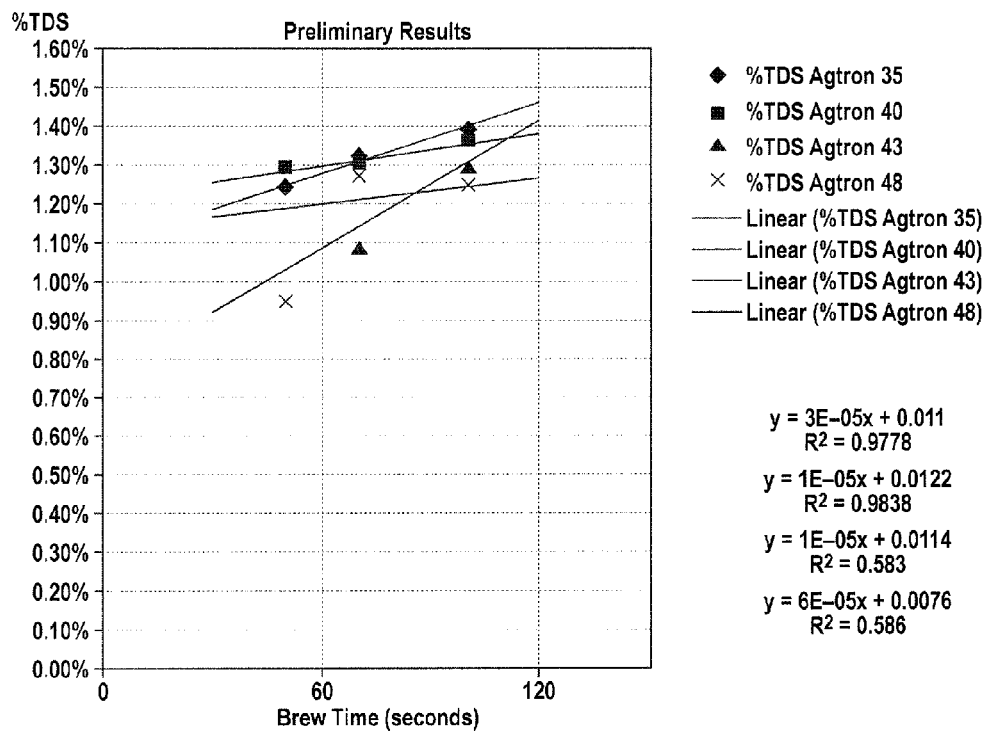
FIG. 12 is a graphical representation of data generated to show the relationship between % TDS and brew time for different Agtron numbers.

Four sample batches of coffee were roasted to Agtron 35, 40, 43, and 28. The method requires that the time needed to get to the target 1.25% TDS be first determined. Several brew cycles spanning the target were run. Then interpolation can be used to indicate the time needed for each Agtron number as graphically shown in FIG. 12.

Figure 13:
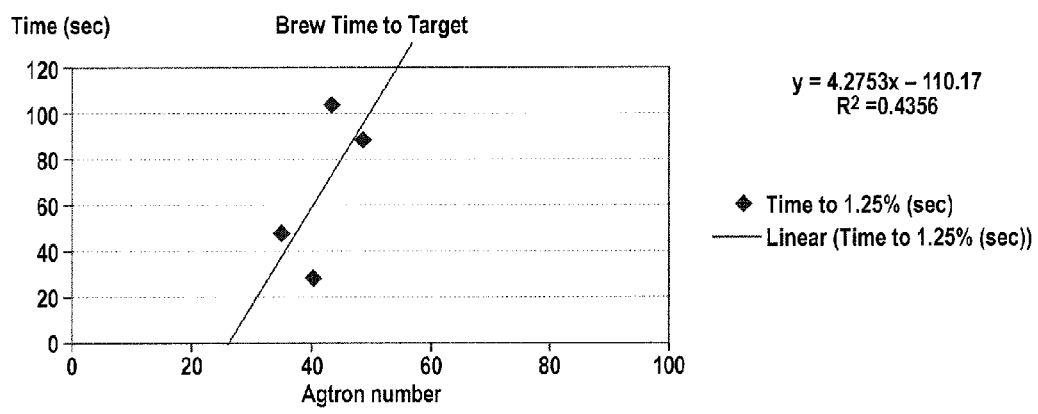
FIG. 13 is a graphical representation of the time necessary for coffee beverage with a targeted 1.25% TDS as a function of Agtron number.

In reference to FIG. 13, for each of the brew lines, one is able to ascertain how many seconds are needed to achieve the targeted 1.25% TDS.

Based upon the graphical representation of FIG. 13, a brew time equation is:

$$BrewTime = 4.3 * AgtronNumber + otherTerms \quad (110)$$

It should first be recognized that the brew size should not change the required brew time. If the same agitation, temperature, ratio, etcetera are preserved, then the size of the brew should not change parameters. In practice however, many little things do change. For example, for a larger pot, the cooling during the brew cycle will be less. In a separate experiment it was shown that the brew temperature does not have a dramatic effect on the extraction rate. A more significant effect may be the evacuation time. If it takes significantly longer to get the brewed coffee out of the brew chamber, the contact time is longer. In another experiment, it was shown that the extraction rate is small if the agitation is turned off. The net is that there will be some effects due to the particular technology used. The NetBrew can then be considered to be just another system variable in the linear equation. That is, the brew time may need to change a little bit with the NetBrew.

It should be appreciated that the forgoing is applicable to any brewing apparatus. It was shown by way of example that the present method applies to a stirred French Press. Also, by way of example, the method apples to the apparatus disclosed in applicant's '514 application. Indeed, this method may be applied to any coffee apparatus with sufficient controlled variables so that brew parameters may be computed.

Another example is the Trifecta® from Bunn®. This device features a forced extraction apparatus with sufficient variables to move along the extraction curve. Unfortunately, they do not provide a method for setting the plethora of options. These include mass of the coffee used, grind size, brew volume, pre-wet, pre-infusion, fill pause, brew time, turbulence on, turbulence off, turbulence power, press out power, press out time, and more. The result is an overly complex apparatus that can only be set by experimentation by a "cupper" that is trained in tasting the brewed product. Bunn® goes so far as to print a "recipe guide" which is a blank table in which to record experiments. The method described herein is readily applied to determine the sensitivity of each of these variables.

The foregoing suggests a preferred embodiment that utilizes the method. In this preferred embodiment the user sets preferences for strength, roast, and grind. Knobs, sliders, display selections, or other device is used to make these selections. These need to be set infrequently as a user may have a Gold Cup coffee or a personal preference with a different taste profile, and routinely purchase a particular type of coffee.

In a preferred embodiment there is no need to measure out a quantity of water. Instead the user merely fills the tank full with water. A means is provided that can deliver any fraction of the water at a later step.

In this preferred embodiment the user simply opens the brewing chamber lid and pours coffee grinds in as is common with conventional drip coffee makers. The brewing chamber may be of the traditional cone shape with a paper filter.

In this preferred embodiment, the apparatus includes a weighing mechanism. This may employ the electronic strain gauge mechanism common in precision electronic balances and inexpensive pocket sized balances. In each step the control means may monitor the mass of the basket in the machine. In this way, the balance can detect the presence of the basket with spent grinds, basket removal for rinsing, basket return, paper or metal filter installation and finally the introduction of fresh grinds.

It is the measurement in this last step that provides a surprising utility. As the grinds are introduced, the brewing method computes the brew cycle parameters. This includes computing the amount of water needed. In a preferred embodiment, a brew quantity indicator displays the amount of coffee that will be produced given the quantity of grinds that have thus far been introduced. As another spoon full of grinds is introduced, the indicator shows the corresponding increase in finished coffee that will be produced.

In this preferred embodiment the brew parameters are now all set and ready to go. In a preferred embodiment, the user only needs to press the start button. In another preferred embodiment, the action of simply closing the lid initiates the brewing cycle. This embodiment represents a remarkable simplicity for the user. One merely shakes some grinds into the cone and closes the lid to make perfect coffee to their exact preferences every time.

In a related preferred embodiment, the user simply puts in the desired water. The volume of the water is readily estimated by the heating rate of the water. Then a grinder grinds the required coffee according to the settings provided.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A method for brewing coffee comprising the steps of providing a dose of coffee grinds having a grind number and an Agtron roast number, steeping the dose in water to create a liquid coffee and wet grounds in suspension, and extracting the liquid coffee from the suspension, wherein the dose is based on a desired amount of liquid coffee divided by 1 minus two times the ratio of desired extraction percentage and desired total dissolved solids percentage, multiplied by the ratio of desired extraction percentage and desired total dissolved solids percentage.

2. The method of claim 1, further comprising the step of steeping the dose in water for a first period of time before extraction.

3. The method of claim 2, wherein the first period of time in seconds is based on approximately −33.8 times the grind number of the coffee grinds.

4. The method of claim 2, wherein the first period of time in seconds is based on approximately 4.3 times the Agtron number.

5. The method of claim 2, further comprising the step of agitating the suspension during the first period of time.

6. The method of claim 5, wherein the first period of time in seconds is based on approximately 409.3 times the desired total dissolved solids percentage.

7. The method of claim 5, wherein the step of agitating the suspension comprises applying pulses of approximately 60 milliseconds.

8. The method of claim 5, wherein the first period of time in seconds is based on approximately 409.3 times the desired total dissolved solids percentage, approximately −33.8 times the grind number of the coffee grinds and approximately 4.3 times the Agtron number.

9. The method of claim 8, further comprising the step of providing a brewing apparatus configured to calculate the first period of time based upon user inputted values for desired extraction percentage, desired total dissolved solids percentage, grind number and Agtron roast number and then automatically create the suspension and subsequently extract the liquid coffee after the first period of time.

* * * * *